United States Patent [19]
Kitamura et al.

[11] Patent Number: 4,849,665
[45] Date of Patent: Jul. 18, 1989

[54] ANTI-VIBRATION MOUNTING FOR VEHICLE ALTERNATOR

[75] Inventors: Yutaka Kitamura; Kazutoshi Kaneyuki, both of Hyogo, Japan

[73] Assignee: Mitsubishi Denki Kabushiki Kaisha, Tokyo, Japan

[21] Appl. No.: 160,413

[22] Filed: Feb. 25, 1988

[30] Foreign Application Priority Data

Feb. 26, 1987 [JP] Japan .................. 62-29320

[51] Int. Cl.⁴ ...................... H02K 5/24; F16F 15/22
[52] U.S. Cl. ............... 310/68 D; 123/195 E; 248/666; 248/674; 310/51; 310/91
[58] Field of Search ........... 123/195 A, 195 E, 198 R; 248/666, 674; 310/51, 68 D, 89, 90, 91

[56] References Cited
U.S. PATENT DOCUMENTS 1,120,399  12/1914  Maxwell ..................... 123/195 E
1,823,203   9/1931  Knecht ........................ 248/674
4,145,626   3/1979  Aroshidze .................... 310/91
4,236,426  12/1980  Meinke et al. ................ 310/51

Primary Examiner—Peter S. Wong
Assistant Examiner—D. L. Rebsch
Attorney, Agent, or Firm—Bernard, Rothwell & Brown

[57] ABSTRACT

An alternator for a vehicle includes a stator mounted on the inner periphery of first and second bowl-like brackets separated by a plane perpendicularly crossing an output shaft, and a core integrally fixed to the shaft and surrounded by the first and second brackets, wherein the shaft is supported at the substantially central portions of the first and second brackets. The improvement comprises upper and lower flanges formed at the outer periphery of the first bracket in such a manner as to extend both parallel to the shaft, and perpendicular, in a direction tangent to the outer periphery of the first bracket, and elongated mounting bolts for fixing the alternator to the vehicle engine at the upper and lower flanges through mounting holes formed through the upper and lower flanges. This tends to isolate the rotor from engine vibration.

6 Claims, 7 Drawing Sheets

ANTI-VIBRATION MOUNTING FOR VEHICLE ALTERNATOR

BACKGROUND OF THE INVENTION

1. Field of the Invention

The present invention relates to a fixing mechanism for an alternator for a vehicle, which mechanism can be easily mounted to an engine and be fixed thereto so that the alternator may not be resonated in receipt of vibration from the engine in a direction along a shaft thereof.

2. Description of the Prior Art

FIG. 1 is a vertical sectional view of a conventional fixing mechanism for an alternator, and FIG. 2 is an elevational view of the alternator shown in FIG. 1 under the condition where the alternator is mounted to the engine. Referring to FIGS. 1 and 2, each of stators 3 includes a stator core 3a and a stator coil 3b wound around the stator core 3a. A pair of dish-like first and second brackets 1 and 2 are engaged at their respective opening ends with both outer edges of each stator 3, and are fixed by tightening bolts 20.

Thus, the stators 3 are held between the first and second brackets 1 and 2. Bearings 4 and 5 are fixedly engaged with the first and second brackets 1 and 2, respectively, and are aligned to each other.

A shaft 6 is rotatably supported on the bearings 4 and 5. Claw tooth field cores 7 and 8 are located inside the stator 3, and are fixed to the shaft 6. A field coil 9 is interposed between the inner circumferences of the field cores 7 and 8.

A pair of fans 10a and 10b are mounted at both ends of the field cores 7 and 8, respectively, and are rotated with field cores 7 and 8 by the rotation of the shaft 6.

A slip ring 12 is fixed to the shaft 6. Thus, a rotor 11 is constituted of the shaft 6, the field cores 7 and 8, the field coil 9, the fans 10a and 10b and the slip ring 12.

A brush 13a is designed to slidingly contact the slip ring 12. The brush 13a is received and retained in the inside end portion of the second bracket 2, thus forming a current collector 13 for feeding a current.

The field cores 7 and 8 and the field coil 9 are rotated together with the shaft 6 by a pulley 15 which is mounted on the shaft 6 and is driven by the engine. The required exciter current is supplied through the brush 13a and the slip ring 12 to the rotating field coil 9.

As a result, an alternating current is induced in the stator coil 3b, and this current is then converted into a direct current by a rectifier 14.

The first bracket 1 is formed at the upper portion of its outer periphery with an upper flange 1a, and is similarly formed at the lower portion of its outer periphery with a lower flange 1b. On the other hand, the second bracket 2 is formed at the lower position of its outer periphery with a flange 2a.

A mounting bracket 40 of the engine is sandwiched between the lower flange 1b of the first bracket 1 and the flange 2a of the second bracket 2, and the alternator is fixed to the engine by fastening a mounting bolt 17 to a mounting nut 18.

A bushing 19 is engaged in the flange 2a, and it is moved by fastening the mounting bolt 17 to the mounting nut 18, so as to eliminate mounting gaps between the mounting bracket 40 and the lower flange 1b and between the mounting bracket 40 and the flange 2a.

As apparent from FIG. 2, the upper flange 1a is positionally adjustably fastened to one end of an adjusting plate 30 by a mounting bolt 16. The other end of the adjusting plate 30 is fixed to the engine.

The first and second brackets 1 and 2 are fastened to each other by plural bolts 20.

Generally, the level of engine vibration in the vehicle is high in a piston moving direction, that is, in a radial direction of the alternator. Especially in a multiple cylinder engine, as there exists a phase difference in the vertical motion of each piston, vibration along the shaft of the alternator tends to occur, and the vibration level increases with an increase in engine speed.

FIG. 3 shows a schematic illustration of a vibration model of the vibration along the shaft of the conventional alternator for the vehicle as a vibration system of two-degrees of freedom. FIG. 4 shows natural frequencies $f_1$ and $f_{1a}$ of the vibration in the vibration system along the shaft of the conventional alternator. In FIG. 4, $f_2$ and $f_{2a}$ show natural frequencies along the shaft of the alternator in the present invention. The natural frequencies $f_1$ and $f_{1a}$ are obtained from the following expression.

$$\left.\begin{array}{c} f_1 \\ f_{1a} \end{array}\right\} = \frac{1}{2\pi}\left[\frac{1}{2M_H M_R}\{M_H K_B + M_R(K_{H1} + K_B) \pm \sqrt{\{M_H K_B - M_R(K_{H1} + K_B)\}^2 + 4M_H M_R K_B^2}\}\right]^{\frac{1}{2}}$$

Referring to FIG. 3, $K_{H1}$ stands for a spring constant of a bracket system in the conventional mounting structure (The spring constant includes bracket and flange rigidities, a mounting bracket rigidity and an adjusting plate rigidity), and $K_{H2}$ stands for a spring constant of a bracket system in the mounting structure of the alternator according to the present invention which will be hereinafter described (The spring constant includes bracket and mounting leg rigidities and mounting bracket rigidity.).

Further, $K_B$ stands for a spring constant of the bearings (The spring constant is common in the prior art and the present invention.); $M_H$ stands for mass of the bracket system; and $M_R$ stands for mass of the rotor.

The lower natural frequency $f_1$ along the shaft in the fixing mechanism for the conventional alternator is present in the range of an excitation frequency along the shaft of the engine in association with an increase in engine speed. Therefore, the conventional alternator is sometimes resonated along its shaft, causing trouble such as breakage of the bracket and the winding.

Further, while the mounting bracket 40 is sandwiched between the lower flange 1b and the flange 2a through the bushing 19, and they are fixed to each other by the mounting bolt 17, the first bracket 1 and the second bracket 2 are fixed through the stators 3 to each other only by the bolts 20. Therefore, fixing strength of both the brackets is weak.

To cope with this problem, the prior art structure is designed to increase the thicknesses of the lower flange 1b and the flange 2a along the shaft, the thickness of the upper flange 1a along the shaft, and the thickness of the adjusting plate 30, thereby increasing the spring constant of the bracket system in the mounting structure. Thus, the natural frequency $f_1$ along the shaft has been intended to be isolated from the range of the excitation frequency of the engine along the shaft of the alternator.

As mentioned above, in order to prevent the resonance along the shaft of the alternator in the prior art structure, the thickness of the bracket along the shaft and the thickness of the flange have been increased to increase the bracket rigidity and the mounting rigidity. However, there remains a problem that this substantial increase in weight of the bracket reduces the resonance to only a limited extent.

SUMMARY OF THE INVENTION

The present invention has been achieved to solve the above-mentioned problem, and it is an object of the present invention to provide an alternator for a vehicle, which is easily mounted, and has an increased rigidity of the bracket and the mounting structure along the shaft of the alternator to prevent the resonance due to the excitation frequency of the engine along the shaft of the alternator and thereby eliminate trouble such as breakage of the bracket and the winding.

The fixing mechanism for the alternator according to the present invention comprises a bowl-like first bracket having a flange adapted to directly abut against an engine block and having an inner surface engaged with an outer periphery of a stator over substantially the entire width thereof, a mounting bolt for tightening the flange of the first bracket in a direction perpendicular to a shaft, and a second bracket having a flange adapted to be tightened through a bushing to the flange of the first bracket by a bolt.

DETAILED DESCRIPTION OF THE PREFERRED EMBODIMENTS

There will now be described some preferred embodiments of the alternator according to the present invention.

Figure 6:
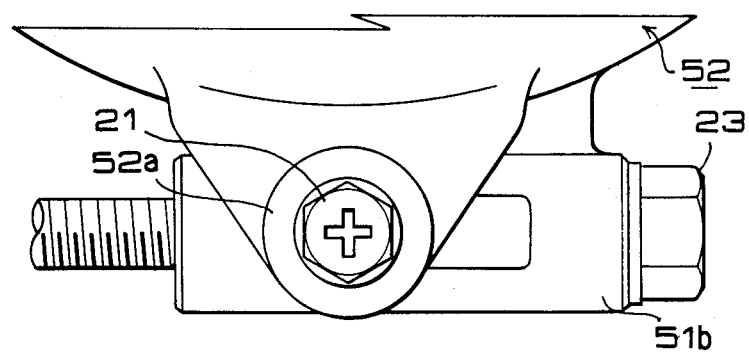
FIG. 6 is an enlarged elevational view of a part of the fixing mechanism in the first preferred embodiment wherein a lower flange is fixed to a flange.
Figure 5:
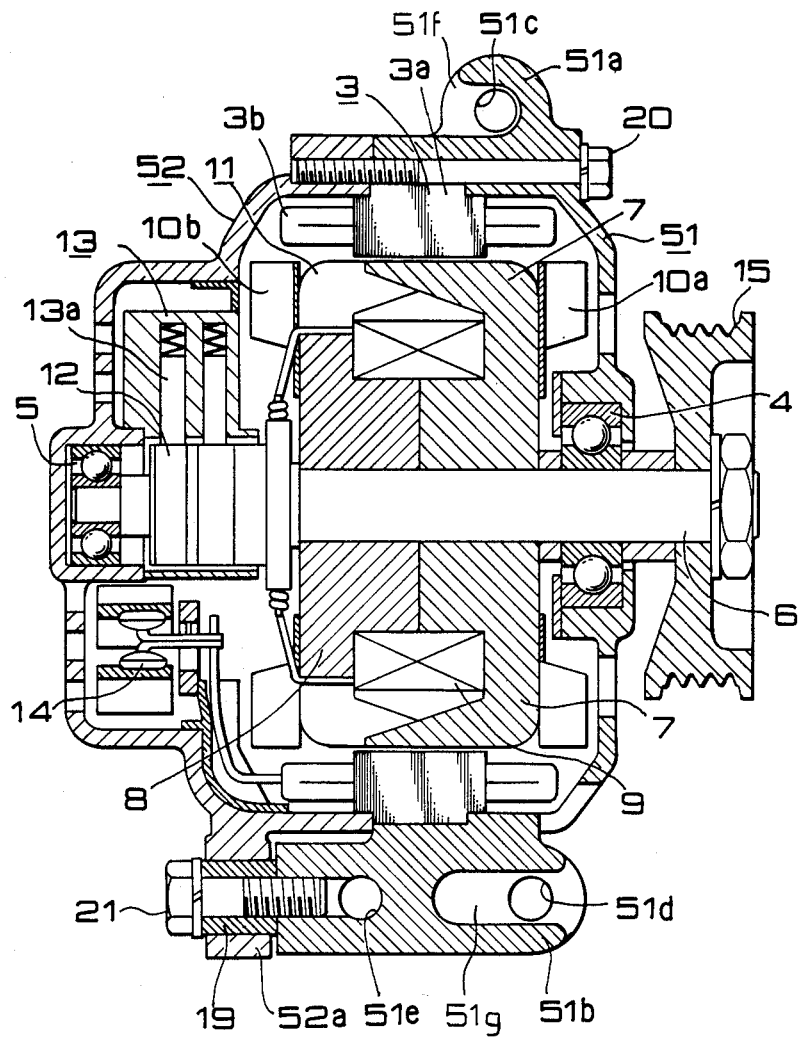
FIG. 5 is a vertical sectional view of a first preferred embodiment of a fixing mechanism for an alternator for a vehicle according to the present invention.

FIG. 5 is a vertical sectional view of a first preferred embodiment of the present invention; FIG. 6 is an enlarged elevational view of a part of the fixing mechanism in the first preferred embodiment wherein a lower flange is fixed to a flange; and FIG. 7 is an elevational view of the alternator in the first preferred embodiment under the condition where the same is mounted to the engine.

Figure 1:
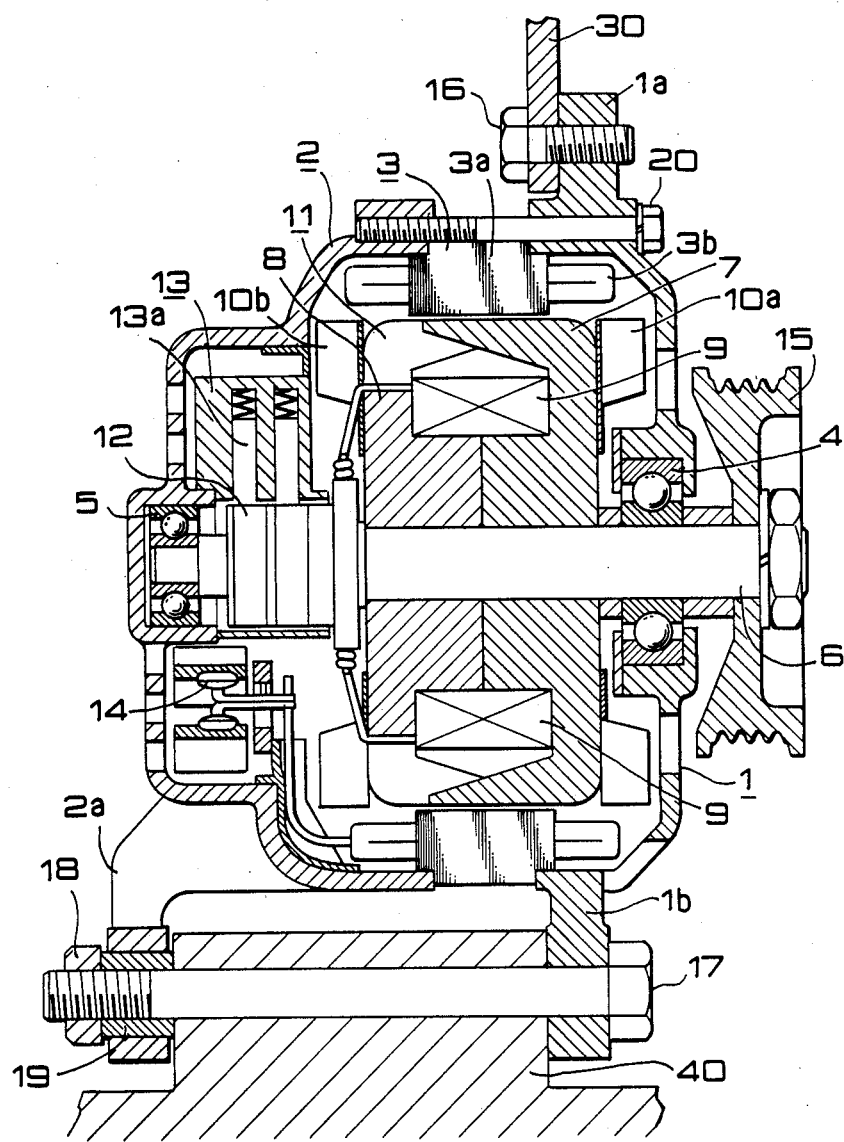
FIG. 1 is a vertical sectional view of the fixing mechanism for the conventional alternator for a vehicle.
Figure 2:
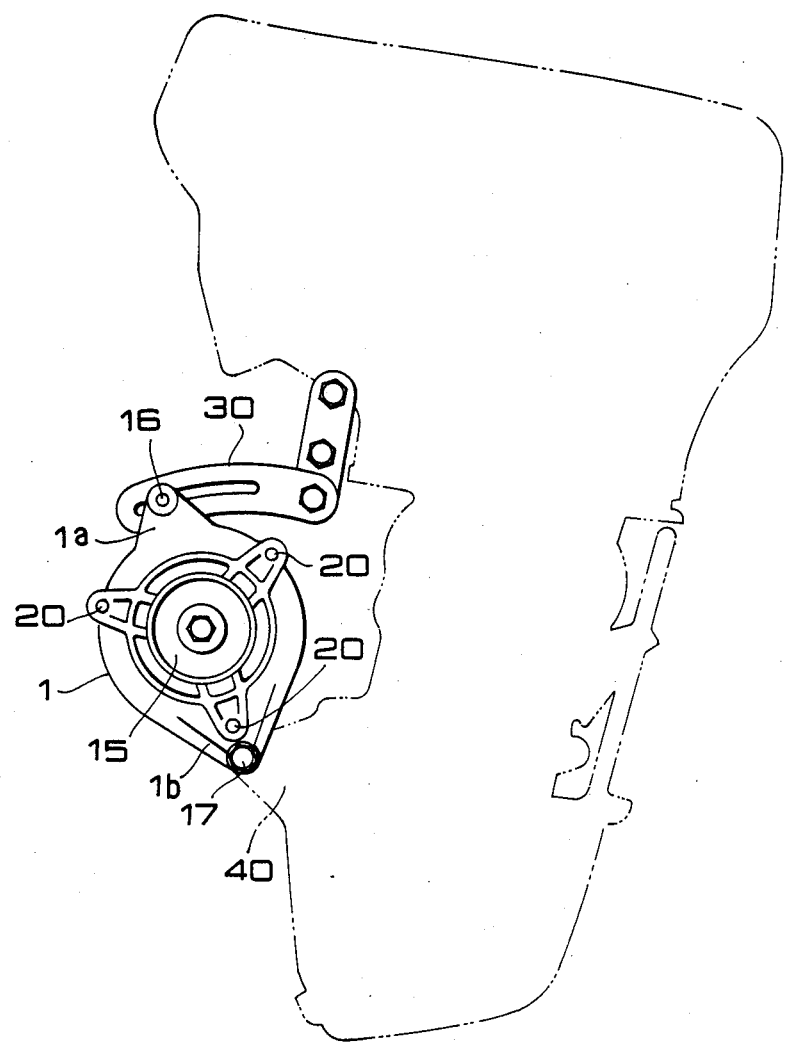
FIG. 2 is an elevational view of the alternator shown in FIG. 1 under the condition where the same is mounted to an engine.
Figure 3:
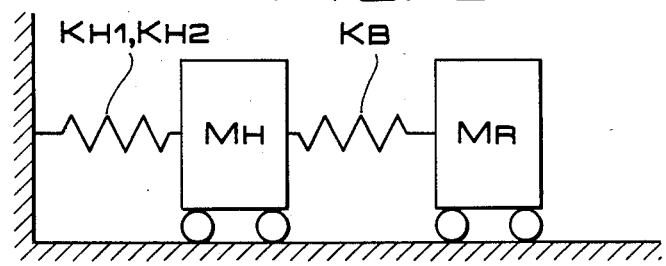
FIG. 3 is an illustration showing a vibration model of the vibration along the shaft in the fixing mechanisms of the alternators in the prior art and the present invention.
Figure 4:
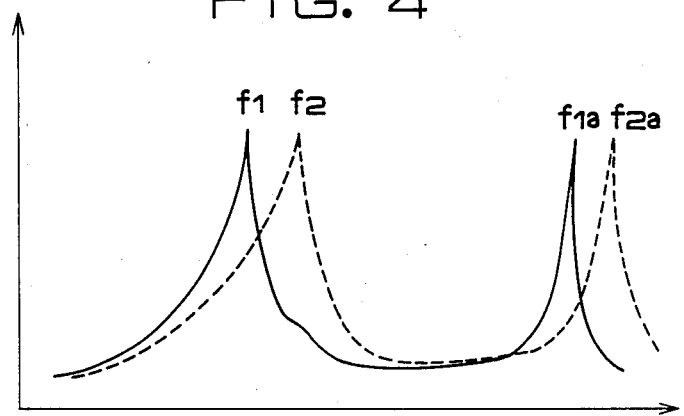
FIG. 4 is a characteristic graph of natural frequencies along the shaft in the fixing mechanisms of the alternators in the prior art and the present invention.
Figure 7:
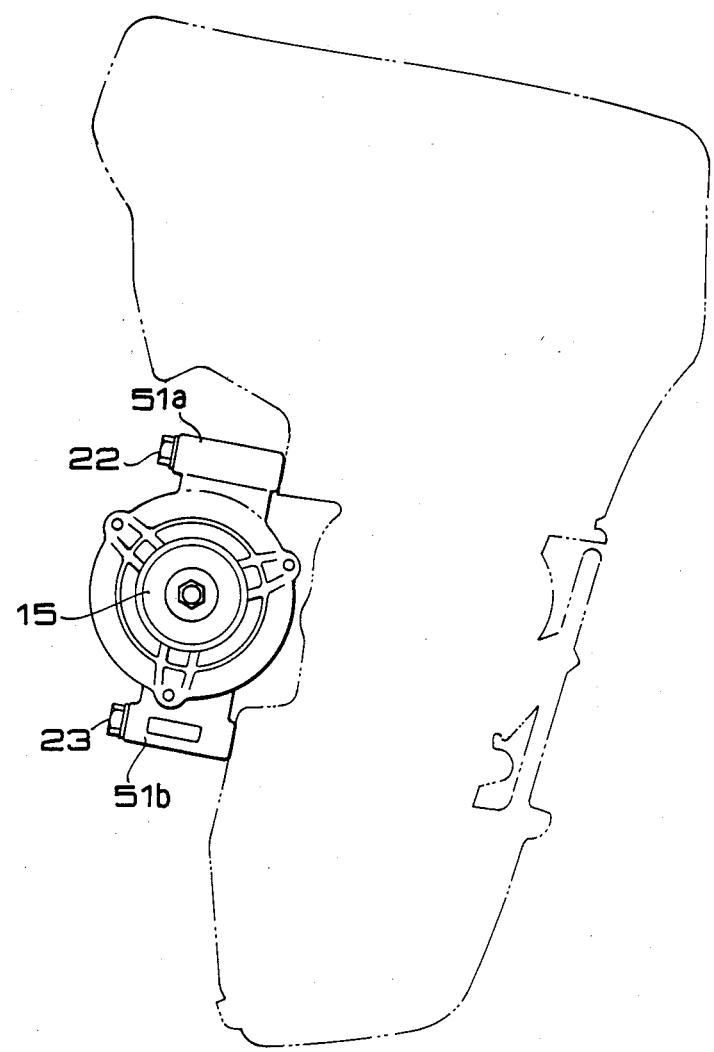
FIG. 7 is an elevational view of the alternator in the first preferred embodiment under the condition where the same is mounted to the engine.

In FIGS. 5 to 7, the same parts as in FIGS. 1 and 2 are designated by the same reference numerals for the purpose of simplicity of explanation, and the following description will refer to only the parts different from those in FIGS. 1 and 2.

As is apparent by comparison with FIGS. 1 and 2, the parts designated by reference numerals 3–15, 19 and 20 are identical with or correspond to those in the prior art alternator shown in FIGS. 1 and 2, and the following construction is different from the prior art and constitutes the feature of the first preferred embodiment of the present invention.

Referring to FIG. 5, the outer periphery of a stator 3 is engaged with the inner periphery of a first bracket 51 over the entire width of the stator 3. The first bracket 51 has a substantially bowl-like shape.

The first bracket 51 is integrally formed with a columnar upper flange 51a extending in perpendicular relationship to a shaft 6 and with a columnar lower flange 51b, both flanges having an elliptic shape in section. The upper flange 51a is formed with a mounting hole 51c for receiving a mount bolt 22 as shown in FIG. 7. The mounting hole 51c is disposed substantially at the center of the elliptical section of flange 51a.

The lower flange 51b is formed with mounting holes 51d and 51e for receiving mounting bolts 23 as shown in FIG. 7. The mounting hole 51d and 51e are disposed substantially at the center of the elliptical section of flange 51d.

As shown in FIG. 5, the flanges 51a and 51b are formed with axially elongated channels 51f and 51g, respectively. These channels reduce the mass of the flanges while maintaining the stiffness. Similar channels are formed in the flanges of other embodiments later described. Thus, the embodiment of FIG. 8 includes channels 51f and 51h in the upper flange 51a and channel 51g in the lower flange 51b. Similarly, the embodiment of FIG. 9 includes the channel 51h in the upper flange 51a in the channel 51g in the lower flange 51b.

A second bracket 52 has an opening end engaging a part of the stator 3. The second bracket 52 is integrally formed with a flange 52a, which is fixed through a bushing 19 to the lower flange 51b by a bolt 21 as shown in FIGS. 5 and 6.

There will now be described the fixing operation of the first preferred embodiment. As the first bracket 51 has a substantially bowl-like shape, the bracket rigidity is high. The columnar upper flange 51a having a high rigidity is formed with the first bracket 51 having a high rigidity. The upper flange 51a is directly abutted against the engine block, without employing the adjusting plate 30 having a low rigidity as used in the prior art, and is fixed to the engine block by the mounting bolt 22. Similarly, the lower flange 51b having a higher rigidity is directly abutted against the engine block and is fixed thereto by the two mounting bolts 23 through the mounting holes 51d and 51e. Accordingly, the mounting rigidity is increased, and the mounting gaps at the upper flange 51a and the lower flange 51b can be reduced, to thereby further improve the bracket rigidity.

Further, the flange 52a of the second bracket 52 is directly fixed by the bolt to the lower flange 51b of the first bracket 51 without interposing the mounting bracket 40 therebetween as used in the prior art. Accordingly, the rigidity of the first and second brackets 51 and 52 as a whole is increased.

By employing the above-mentioned fixing mechanism, the bracket rigidity and the mounting rigidity have been remarkably improved as compared with those in the prior art. Therefore, the natural frequency along the shaft has been increased by about 15%, thereby making the same completely isolated from the range of the excitation frequency of the engine along the shaft of the alternator, and eliminating problems such as breakage of the bracket and the winding.

Moreover, since the alternator of the present invention is fixed by the mounting bolts 22 and 23 perpendicular to the engine block, the mounting operation is rendered easy.

Figure 8:
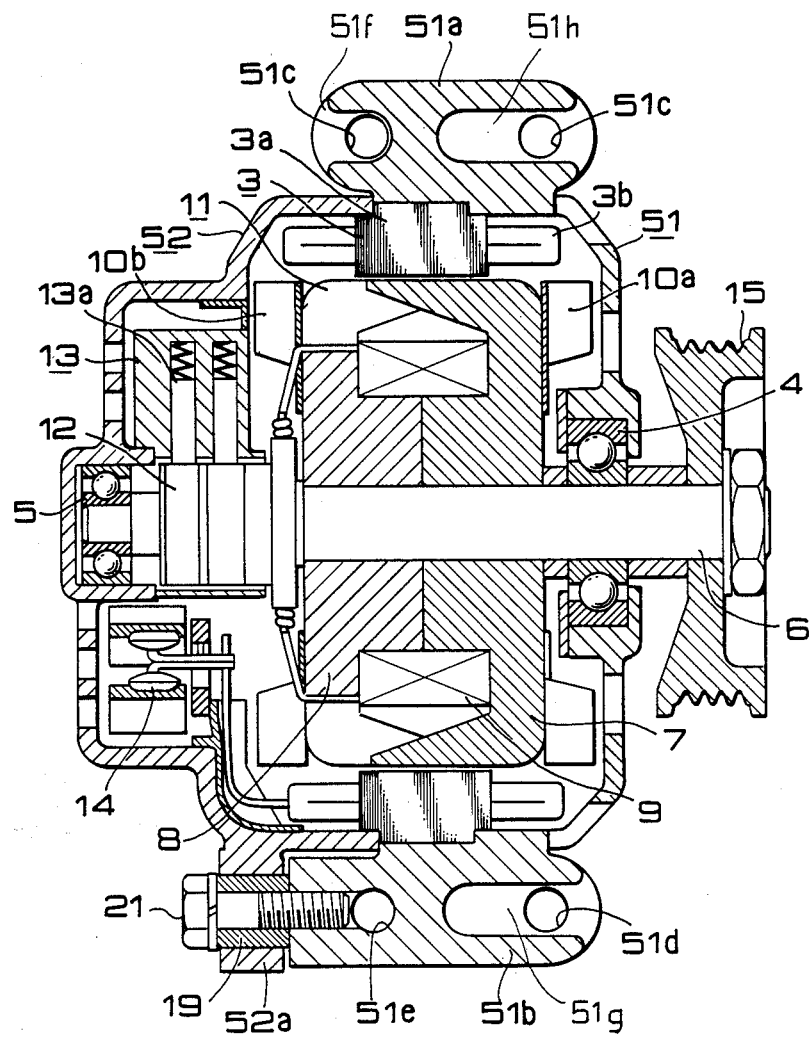
FIGS. 8 and 9 are vertical sectional views of second and third preferred embodiments of the present invention, respectively.

Although the upper flange 51a of the first bracket 51 has the single mounting hole 51c for inserting the mounting bolt 22 in the first preferred embodiment, the upper flange 51 may have two mounting holes 51c as shown in FIG. 8 which illustrates a second preferred embodiment of the present invention. Accordingly, two mounting bolts are engaged in the engine block through the mounting holes 51c of the upper flange 51a and two mounting bolts are engaged in the engine block through the mounting holes 51d and 51e of the lower flange 51b in the second preferred embodiment.

Figure 9:
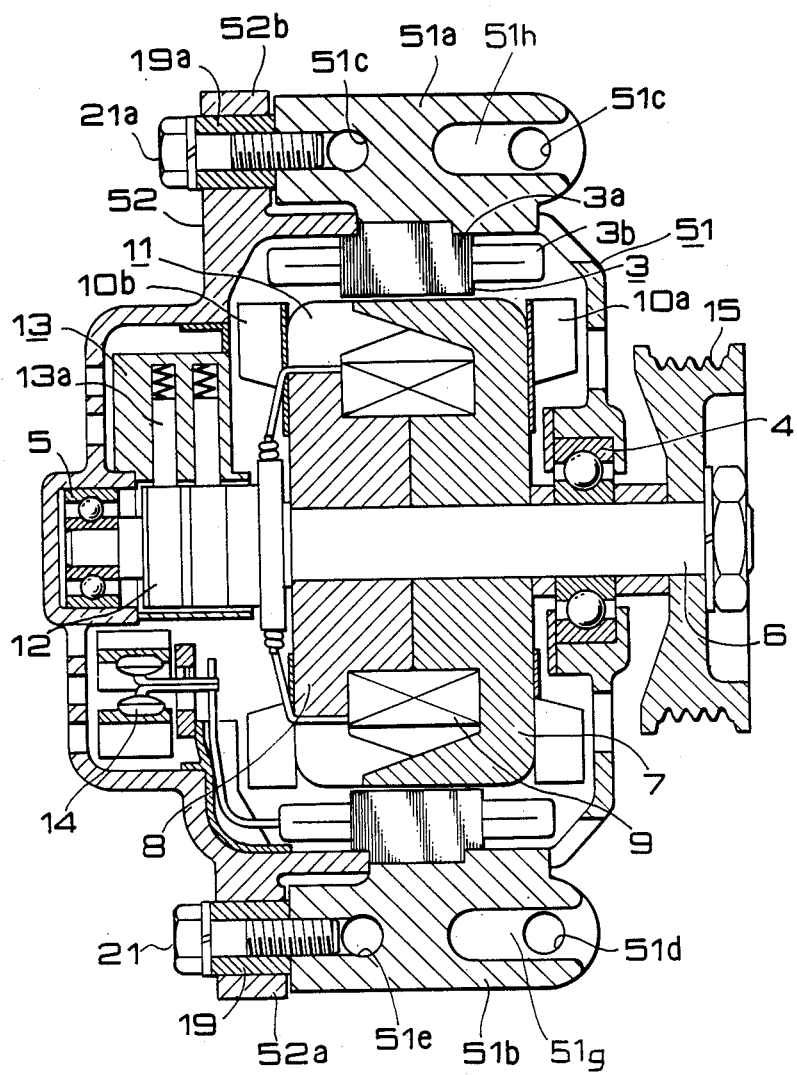

FIG. 9 shows a third preferred embodiment of the present invention, wherein the second bracket 52 is formed with lower and upper flanges 52a and 52b. The upper and lower flanges 52a and 52b are fixed through bushings 19 and 19a to the lower and upper flanges 51b and 51a of the first bracket 51 by bolts 21 and 21a, respectively.

As described above, according to the present invention, the first bracket is formed in a bowl-like shape having a high rigidity, and the inner periphery of the first bracket is engaged with the outer periphery of the stator over substantially the entire width thereof. The columnar upper and lower flanges of the first bracket are directly abutted against the engine block, and are fixed by fastening the mounting bolts to the engine block in a direction perpendicular to the longitudinal direction of the shaft. Furthermore, the flange of the second bracket is fixed through the bushing to the flange of the first bracket by a bolt. With this structure, the rigidity along the shaft of the engine can be increased to thereby prevent the resonance due to the excitation frequency of the engine along the shaft of the alternator.

What is claimed is:

1. A fixing mechanism for an alternator for a vehicle, comprising a first bracket having a bowl-like shape and having an inner periphery engaged with an outer periphery of a stator in said alternator over substantially the entire width of said stator, said first bracket being formed with columnar upper and lower flanges having bolt mounting holes extending in perpendicular relationship to a longitudinal direction of a shaft in said alternator; a second bracket integrally formed with a flange having a mounting hole extending in parallel relationship to the longitudinal direction of said shaft, said stator being held between said first bracket and said second bracket; and a mounting bolt for fixing said flange of said second bracket to said lower columnar flange of said first bracket.

2. The fixing mechanism for the alternator as defined in claim 1, wherein said upper and lower flanges of said first bracket have a plurality of said bolt mounting holes for receiving mounting bolts.

3. The fixing mechanism for the alternator as defined in claim 1, wherein said second bracket has a pair of flanges to be fixed through bushings to said upper and lower flanges of said first bracket.

4. A fixing mechanism for an alternator for a vehicle, comprising:

a first bracket composed of a bowl-like body supporting at the center of the body one end of an output shaft of said alternator on which a pulley is mounted, said bowl-like body having an opening portion engaged at the inner periphery of the body with a stator, and substantially cylindrical upper and lower flanges integrally formed with said bowl-like body at opposite positions on the outer periphery thereof with respect to said shaft in a direction tangent to the outer periphery of said body;

a second bracket composed of a dish-like body supporting at the center of the body the other end of said output shaft, said dish-like body surrounding a core provided inside said stator about the outer circumference of said shaft to receive a rotational driving portion of said alternator in combination with said first bracket, said second bracket being formed with flanges opposed to said upper and lower flanges of said first bracket and fixed thereto by mounting bolts; and three elongated mounting bolts for fixing said first bracket to an engine of said vehicle.

5. The fixing mechanism for the alternator as defined in claim 4, wherein said substantially cylindrical upper and lower flanges are formed with axially elongated channels.

6. The fixing mechanism for the alternator as defined in claim 4, wherein said upper and lower flanges are columnar portions having a substantially elliptic shape in section, each flange being formed with two mounting holes at substantially center positions of the elliptic shape, and said elongated bolts are received in two mounting holes of said upper flange and the two mounting holes of said lower flange to fix said upper and lower flanges to said engine.

* * * * *